United States Patent
Chen et al.

(10) Patent No.: US 10,804,815 B1
(45) Date of Patent: Oct. 13, 2020

(54) DC/AC INVERTER SYSTEM SUPPLIED BY INTEGRATED POWER NETWORKS TO INCREASE OUTPUT POWER WITH ROBUST AUTO STOP CONTROL

(71) Applicant: FORD GLOBAL TECHNOLOGIES, LLC, Dearborn, MI (US)

(72) Inventors: Hanyang B. Chen, Canton, MI (US); Michael J. Irby, Monroe, MI (US); Alan F. Judge, Farmington Hills, MI (US); Anthony T. Spoto, Birmingham, MI (US); Stuart C. Salter, White Lake, MI (US); Jason Baker, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/515,304

(22) Filed: Jul. 18, 2019

(51) Int. Cl.
*H02J 7/14* (2006.01)
*H02M 7/5375* (2006.01)
(Continued)

(52) U.S. Cl.
CPC ........... *H02M 7/5375* (2013.01); *B60L 50/14* (2019.02); *F02N 11/0814* (2013.01);
(Continued)

(58) Field of Classification Search
CPC ...... H02J 7/1423; H02J 7/1438; H02J 7/0032; H02J 7/143
See application file for complete search history.

(56) References Cited

U.S. PATENT DOCUMENTS

| 5,461,264 A | 10/1995 | Yang |
| 6,218,643 B1 * | 4/2001 | Iwata ..................... H02J 7/1438 |
| | | 219/202 |

(Continued)

FOREIGN PATENT DOCUMENTS

| EP | 1151892 A2 | 7/2001 |
| GB | 2518759 A | 1/2015 |
| WO | 2013115034 A1 | 8/2013 |

OTHER PUBLICATIONS

X. Gong, R. Xiong and C. C. Mi, "Study of the characteristics of battery packs in electric vehicles with parallel-connected lithium-ion battery cells," 2014 IEEE Applied Power Electronics Conference and Exposition—APEC2014, Fort Worth, TX, 2014, pp. 3218-3224.

*Primary Examiner* — Harry R Behm
(74) *Attorney, Agent, or Firm* — Frank L. Lollo; MacMillan, Sobanski & Todd, LLC

(57) ABSTRACT

A vehicle operates an internal combustion engine according to an automatic start-stop function to reduce fuel consumption. A first DC bus is adapted to connect to a plurality of DC loads. A primary battery is coupled between the first DC bus and a ground. A first alternator is driven by the internal combustion engine to supply electrical power to the first DC bus. A second DC bus is connected to a positive terminal of an auxiliary battery. A negative terminal of the auxiliary battery is connected to the first DC bus. A second alternator is driven by the internal combustion engine to supply electrical power to the second bus at a voltage corresponding to a sum of voltages of the primary and auxiliary batteries. An inverter receives electrical power from the second DC bus to generate an AC output adapted to connect to accessory AC loads.

17 Claims, 5 Drawing Sheets

(51) Int. Cl.
*H02M 7/48* (2007.01)
*B60L 50/14* (2019.01)
*F02N 11/08* (2006.01)

(52) U.S. Cl.
CPC ......... *H02J 7/1423* (2013.01); *H02M 7/4826* (2013.01); *B60L 2210/40* (2013.01); *H02J 7/1438* (2013.01)

(56) References Cited

U.S. PATENT DOCUMENTS

| | | | |
|---|---|---|---|
| 8,057,262 B2 | 11/2011 | Oakes | |
| 9,776,635 B2 | 10/2017 | Khafagy et al. | |
| 10,029,572 B2 | 7/2018 | Sakatani et al. | |
| 2003/0057776 A1* | 3/2003 | Takase | H02J 7/1423 307/43 |
| 2003/0210014 A1* | 11/2003 | Jabaji | H02J 7/0031 320/104 |
| 2003/0225501 A1* | 12/2003 | De La Salle | B60K 6/485 701/93 |
| 2009/0194177 A1* | 8/2009 | Yokota | F04B 35/04 137/565.18 |
| 2014/0042816 A1* | 2/2014 | Hernandez | H02J 1/08 307/71 |
| 2017/0179858 A1* | 6/2017 | Oswald | H02P 27/06 |
| 2018/0334158 A1 | 11/2018 | Chen et al. | |
| 2019/0173406 A1* | 6/2019 | Kouchi | F28D 20/028 |
| 2019/0263274 A1* | 8/2019 | Scolari | H02J 7/14 |

* cited by examiner

DC/AC INVERTER SYSTEM SUPPLIED BY INTEGRATED POWER NETWORKS TO INCREASE OUTPUT POWER WITH ROBUST AUTO STOP CONTROL

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to motor vehicle electrical systems, and, more specifically, to an electrical architecture having a low voltage bus for powering typical DC loads and a higher voltage bus for powering a DC/AC inverter supporting AC loads.

Cars, trucks, and other motor vehicles driven by internal combustion engines have typically employed an electrical system based on a DC voltage at about 12 volts. The DC power is derived from a storage battery (nominally at 12V) and an alternator. The alternator is driven by the engine and controlled by a voltage regulator that varies the alternator output to recharge the battery and maintain a desired voltage on a DC bus that connects to various DC loads including a starter motor.

In order to facilitate the connection of portable electric devices, vehicles typically include one or more power points in the form of sockets into which the portable devices can be plugged in to receive power. When first introduced, the power points were designed to supply the same 12 VDC as used by the fixed vehicle loads. More recently, DC/AC inverters have been introduced into vehicles for supplying 110V 60-cycle/Second AC to power points configured to accept standard wall plugs (as used in buildings). As a result, portable devices that can be electrically powered include AC loads such as laptops, entertainment devices, and battery chargers for powered hand tools. The AC power outlets may be located in a passenger compartment, cargo compartment, or bed of a truck. Typically, available AC output power from an inverter supplied by a standard 12V DC bus is about 400 Watts or less due to power limitations of the 12V DC bus and corresponding efficiency of a 12V DC system.

In order to support a reasonable range of types of AC loads in certain vehicles such as trucks and SUVs, it is desirable for the AC inverter to have an output capacity of 2000 Watts or higher. To obtain this level of output power together with reasonable efficiency, it is preferable to utilize an input voltage to the inverter higher than the 12V available from the standard DC bus. For example, a separate DC bus operating at a nominal 24 VDC has been used wherein an auxiliary 24V battery and auxiliary 24V alternator are connected to the separate bus to supply power exclusively to a DC/AC inverter. Providing a duplicate battery and alternator just for the AC power outlet(s), however, can result in significant manufacturing costs. In addition, packaging space for the components in the vehicle is limited. To minimize the impacts on cost and space, a relatively small battery size has been used for the 24V power net. In a common design, two small 12V lead-acid batteries (e.g., each with a capacity of 8 Ah) are connected in series to provide a combined 24V to the auxiliary bus. In comparison, the primary battery may typically have a capacity of 80 Ah in order to provide reliable starting of the internal combustion engine. Since they are a commonly available product which is mass produced for use in other applications, the 8 Ah battery is a good choice due to its low cost and small size. The feature as used in trucks and SUVs is sometimes referred to as Power-to-the-Box (PttB).

A potential disadvantage of the use of small capacity batteries, however, is that it limits the amount of time that the AC power outlet can be used without the internal combustion engine running (i.e., the time that the AC inverter operates on battery power without any contribution by the alternator). When the alternator is being driven by the engine, the batteries also function to 1) provide transient power during times when the load demand exceeds the rated power of the alternator and 2) absorb excess power flowing from the alternator during a load dump (i.e., when a significant load connected to the AC outlet is turned off). The smaller batteries are also less effective at performing these functions.

The restricted duration of operation with the engine not running may be particularly problematic in a vehicle equipped to provide an automatic engine start-stop (SS) function (also known as Auto Stop). In an Auto Stop system, the engine is automatically turned off when it would otherwise be idling in order to reduce fuel usage and engine emissions. When battery drain become too great or when the driver presses the accelerator pedal to resume movement, the engine automatically restarts. The use of AC loads plugged into the AC inverter during driving can reduce the engine off time during Auto Stop events, thereby limiting the benefits to fuel efficiency and emissions reduction. The impact can be especially significant at low temperatures or with aged batteries, both of which reduce the battery capacities.

SUMMARY OF THE INVENTION

The invention enables an increase in available power for supporting AC loads during vehicle Auto Stop. In this design, a pair of auxiliary batteries for a high voltage power net are connected in parallel, and the parallel combination is connected in series with a low voltage (e.g., 12V) power net. A total number and size of batteries for the combined power nets is the same as for separate power nets of the prior art. During vehicle Auto Stop, a total available electric power that can be provided from this modified 24V battery package to the AC inverter is more than three times the power in the conventional design. Therefore, the vehicle will realize more opportunities for Auto Stop and a higher fuel economy improvement. In addition, the combined 24V-12V architecture will be able to support high surging loads connected to the PttB.

In one aspect of the invention, a vehicle comprises an internal combustion engine. A first DC bus is adapted to connect to a plurality of DC loads. A primary battery is coupled between the first DC bus and a ground. A first alternator is driven by the internal combustion engine to supply electrical power to the first DC bus. A second DC bus is connected to a positive terminal of an auxiliary battery. A negative terminal of the auxiliary battery is connected to the first DC bus. A second alternator is driven by the internal combustion engine to supply electrical power to the second bus at a voltage corresponding to a sum of voltages of the primary and auxiliary batteries. An inverter receives electrical power from the second DC bus to generate an AC output adapted to connect to accessory AC loads.

DETAILED DESCRIPTION OF PREFERRED EMBODIMENTS

Figure 1:
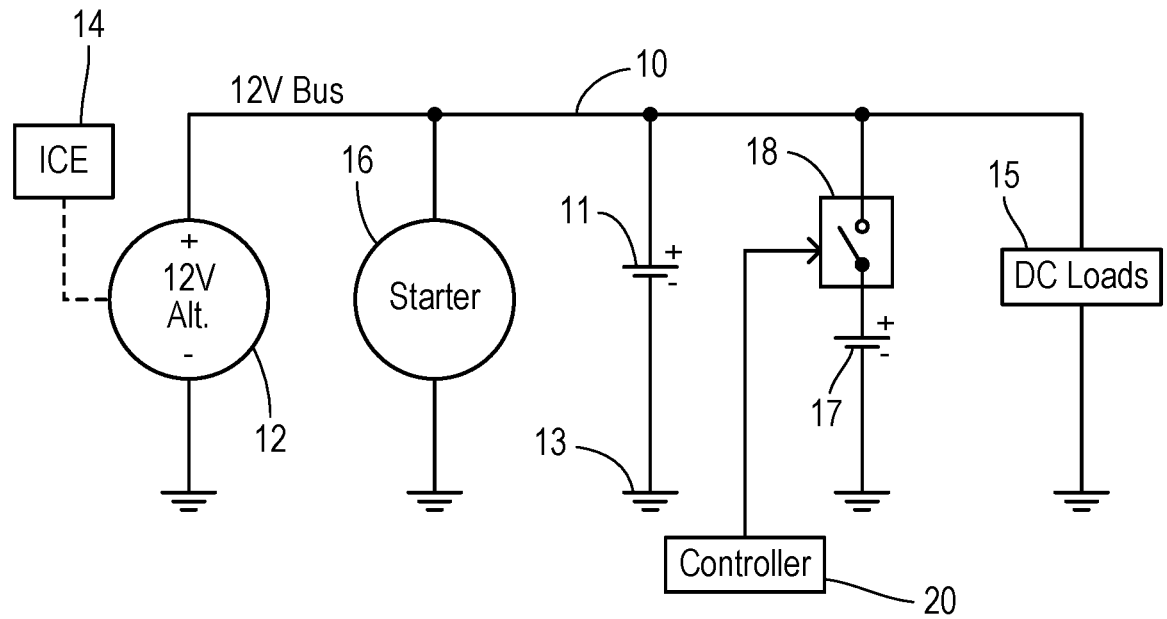
FIG. 1 is a block diagram showing a prior art 12V electrical architecture including a secondary battery for improvement of smart regeneration and charging (SRC).

FIG. 1 shows a typical 12 volt power net having a bus 10 supplied by a primary battery 11 and an alternator 12. Bus 10 is referenced to a ground 13 (typically comprised of a chassis ground). Typically, there is a battery sensor mounted on negative pole of the primary battery to monitor battery parameters. Alternator 12 is driven by an internal combustion engine 14 as known in the art. DC power available at bus 10 from primary battery 11 and/or alternator 12 can be supplied to various DC loads 15 and to a starter motor 16.

Known 12 volt power nets have sometimes included a secondary battery 17 to increase overall capacity in order to improve performance related to Auto Stop and to implement another enhancement known as smart-regen-charge (SRC). For SRC, secondary battery 17 typically has a rated capacity less than the rated capacity of primary battery 11 but has a high acceptance of battery charging current. In particular, secondary battery 16 may preferably be comprised of a lithium ion battery. During braking or coasting of the vehicle, alternator 12 can be used to generate electrical energy that can be used to charge secondary battery 17 (e.g., even when primary battery 11 has a full state of charge). Thus, energy that would otherwise be wasted can be captured and stored in secondary battery 17 to be used to supplement performance of Auto Stop by extending the duration of a stop event, for example. Secondary battery 17 may be isolated by a switch 18 under control of a controller 20. Isolation of secondary battery 17 may be desirable during certain predetermined conditions such as engine cranking. Secondary battery 17 would not be isolated during Auto Stop or during times of a high key-off-load or a low state of charge of primary battery 11.

Figure 2:
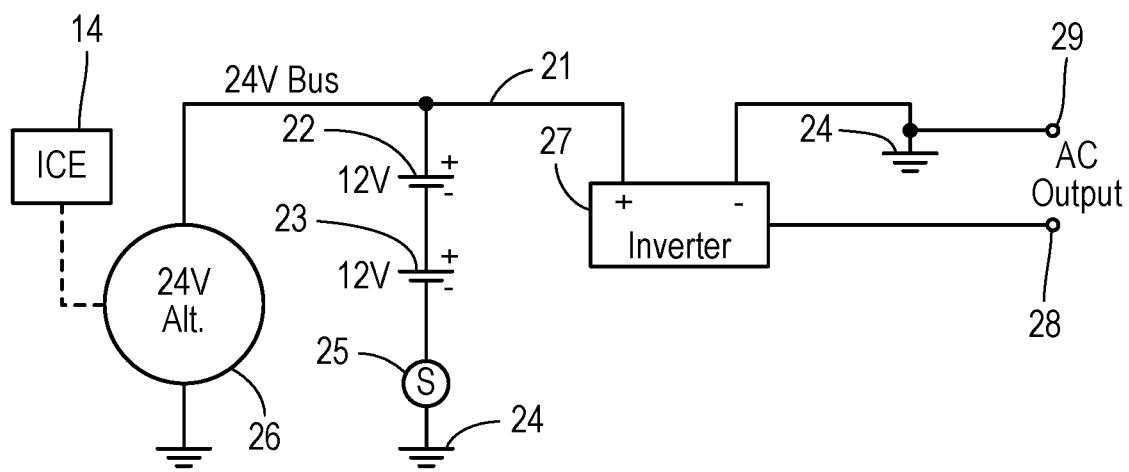
FIG. 2 is a block diagram showing a prior art electrical architecture for a separate 24V bus supporting an AC inverter for auxiliary AC loads.

FIG. 2 shows a separate 24 V power net for supporting a DC/AC inverter and an AC power outlet. 24V bus 21 is supplied by a pair of auxiliary batteries 22 and 23 connected in series between bus 21 and a chassis ground 24. A current sensor 25 is provided in series with batteries 22 and 23 for evaluating battery state of charge (SOC) as known in the art. Bus 21 is also powered by a 24V alternator 26 which is likewise driven by internal combustion engine 14. The 24V power from bus 21 is provided to an input of an inverter 27 which generates an AC output at terminals 28 and 29. The battery SOC and a measured voltage on bus 21 are used to regulate the output of alternator 26 using well known methods.

The series combination of batteries 22 and 23 achieves the required 24V supply while using readily available batteries with a relatively small capacity, such as 8 Ah. Batteries 22 and 23 may preferably be comprised of lead acid batteries. In FIG. 1, secondary battery 17 may preferably be a lithium-ion battery with a small capacity such as 8 Ah. Primary battery 11 is preferably comprised of a lead acid battery having a higher capacity such as 80 8H. As previously described, the small capacity of auxiliary batteries 22 and 23 may impair or reduce the ability to handle power surges or shortfalls and may limit use of AC power during Auto Stop, or limit use of Auto Stop while high AC power loads are active.

Figure 3:
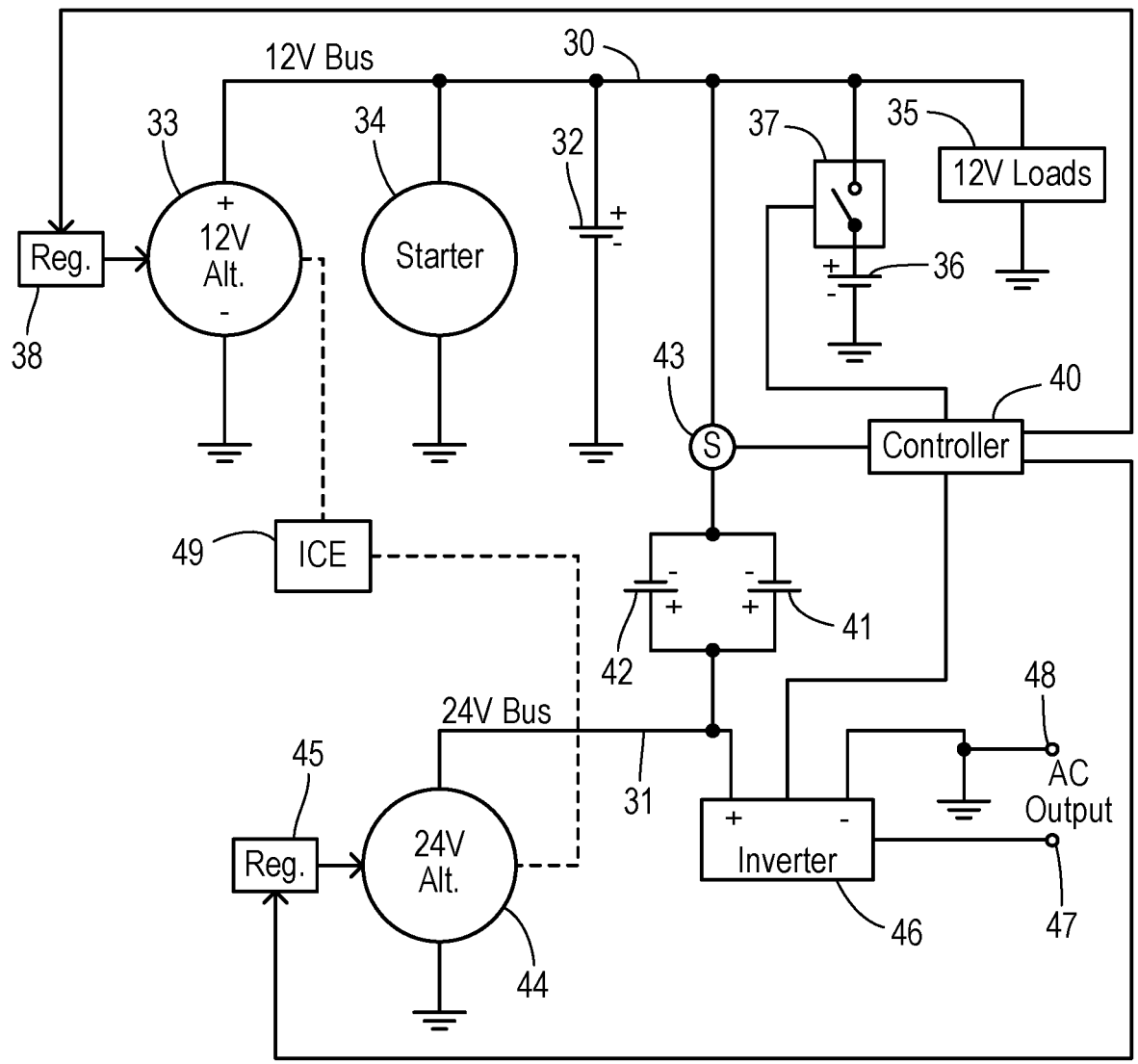
FIG. 3 is a block diagram showing one preferred embodiment of the invention which combines the DC buses in order to increase available power for the AC inverter during engine Auto Stop.

To increase battery capacity which is available to the 24 volt power net without increasing battery sizes or requiring additional components, a novel architecture as shown in FIG. 3 is adopted. A low-voltage (e.g., 12V) bus 30 and a high-voltage (e.g., 24V) bus 31 are integrated into a single electrical architecture in this preferred embodiment. Bus 30 receives 12-volt electrical power from a primary battery 32 and a 12V alternator 33. The loads supplied by bus 30 include a starter motor 34 and conventional 12-volt loads 35. In connection with the Auto Stop and SRC functions, a secondary battery 36 is coupled with bus 30 through a switch 37 (e.g., a MOSFET) driven from a controller 40. Controller 40 also controls a regulator 38 which varies a field current to alternator 33 a produce a desired output voltage from alternator 33 in a known manner.

A pair of auxiliary batteries 41 and 42 are connected in parallel between bus 30 and bus 31 via a current sensor 43. The parallel combination of auxiliary batteries 41 and 42 provides a 12V voltage boost over bus 30, resulting in a bus voltage on bus 31 of 24V. Bus 31 also receives electrical power at about 24V from an alternator 44 which is controlled by a regulator 45 via controller 40. Inverter 46 is connected as a load on bus 31 to generate an AC output at terminals 47 and 48. Alternators 33 and 44 are each driven from internal combustion engine 49 (e.g., by a pulley).

As a result of the interaction between buses 31 and 30, inverter 46 is supported by auxiliary batteries 41 and 42 and by primary battery 32 (and also potentially by secondary battery 36). The increased battery capacity extends the potential duration of Auto Stop events since more power is available to inverter 46 without requiring a restart of engine 49 to power any devices connected to AC output terminals 47 and 48. In addition, the battery capacity for absorbing load surges and load dumps during the times when alternator 44 is active is also increased. It has been found that the total available electric power using the architecture shown in FIG. 3 can be more than three times as great as what is obtained with the architecture shown in FIG. 2 for the same size components.

In FIG. 3, the pair of auxiliary batteries 41 and 42 can be replaced by a single 12V battery or multiple 12V batteries connected in parallel, depend on requirements of vehicle programs based on cost, output power, and corresponding packaging considerations. Also, bus 31 in FIG. 3 can be maintained at other voltage levels, such as 36V or 48V, by using a corresponding auxiliary battery package and other components designed for 24V or 36V.

Figure 4:
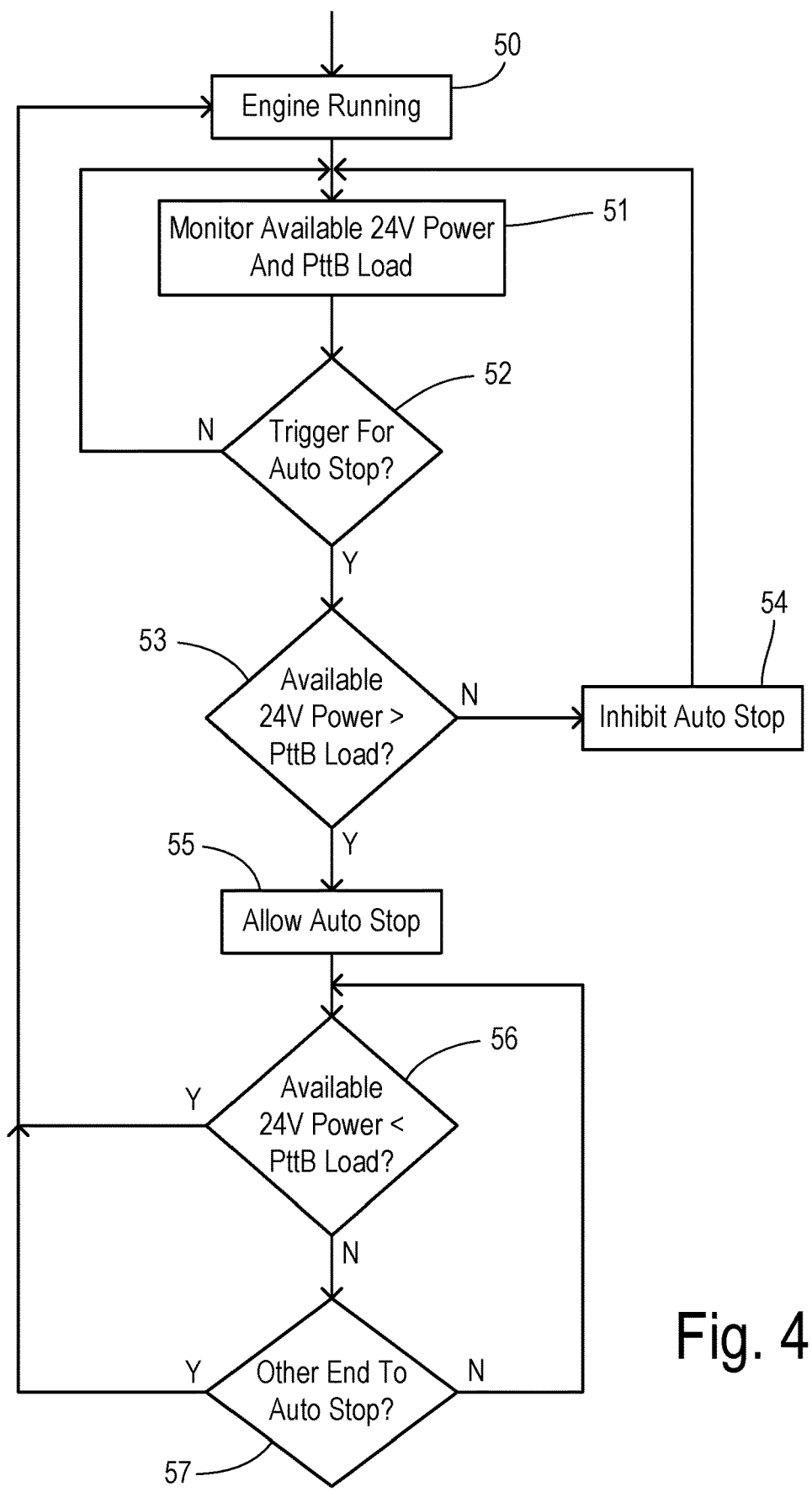
FIG. 4 is a flowchart showing a first preferred method of the invention.

FIG. 4 shows a preferred method for operating the Auto Stop function using the electrical architecture of FIG. 3 wherein the 24V and 12V power nets are interconnected. The method may be performed in controller 40 according to appropriately configured software or firmware, or can utilize other known types of control circuits. For example, the controller can be a combination of a BCM (Body Control Module) and a PCM (Powertrain Control Module). The Auto Stop function monitors various conditions when the engine is running in step 50. In particular, available 24V power and the load (i.e., power consumption of the AC loads connected to the PttB) are monitored. In step 52, a check is performed to determine whether a trigger has occurred to initiate an Auto Stop event (e.g., whether the vehicle has a velocity of zero for a predetermined time). If a trigger has not occurred, then the method continues to monitor power and the 24V load in step 51.

When an Auto Stop event is triggered, the available battery power is checked in step 53. The battery power can be calculated from the SOC of each battery. A check is performed to determine whether the available 24V battery power is greater than the inverter load. If it is not, then Auto Stop is inhibited in step 54 and a return is made to step 51. If the 24-volt battery power is sufficient, then the Auto Stop event is allowed in step 55. During the auto stop event, the method continues to monitor in step 56 whether available 24V battery power has dropped to less than the PttB load. If so, then the engine is restarted in step 50. Otherwise, a check is performed in step 57 to detect whether another condition for ending the Auto Stop event has occurred (e.g., the driver attempts to move the vehicle or another load such as a climate control demands it). If so, then the engine is restarted in step 50. Otherwise, a return is made to step 56 for continued monitoring of available battery power.

Figure 5:
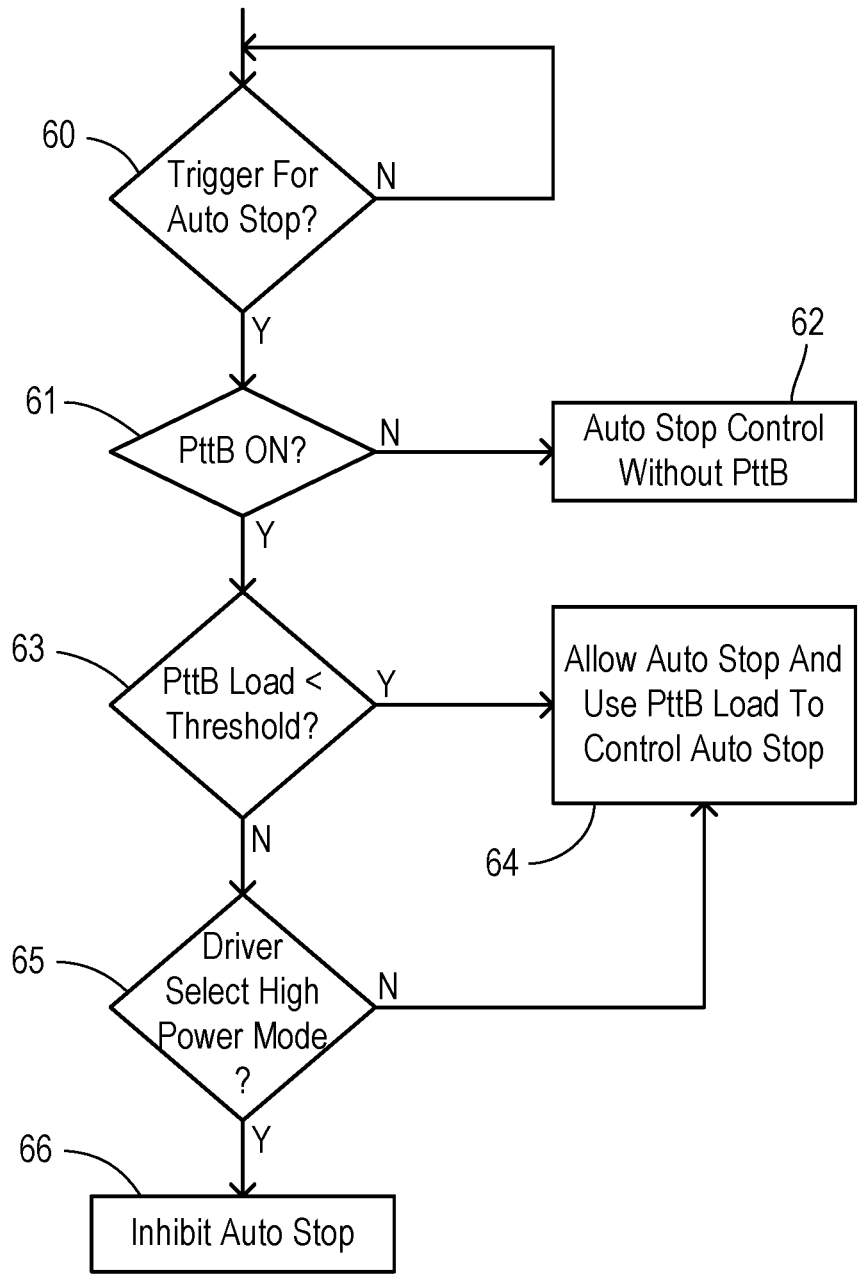
FIG. 5 is a flowchart showing a second preferred method of the invention.

FIG. 5 shows an alternative embodiment for controlling Auto Stop events which allows a user to prioritize continued power to the AC loads over fuel economy improvement. In step 60, a check is made to determine whether an Auto Stop trigger has occurred. Once a trigger condition is detected, a check is performed in step 51 to determine whether the PttB function is on (i.e., the AC inverter is operating). If not, then conventional Auto Stop control is activated in step 62 without consideration for the 24V loads. If PttB is on, then a check is performed in step 63 to determine whether the 24V power draw (i.e., the PttB load) is less than a predetermined threshold. The threshold may have a value that distinguishes between high priority/high power loads such as a refrigerator or other appliances which need continuous power to function correctly versus lower power loads which may be more tolerant of interruption. For example, the threshold may be about 400 W. When the load is less than the threshold, then Auto Stop is allowed in step 64 and the active state of the PttB is taken into account in controlling the duration of an Auto Stop event. If the 24V load is greater than the threshold, then a check is performed to determine whether the driver has selected a high-power mode in step 65. The high-power mode can be manually set to designate that the driver wants to ensure the fullest power to the AC loads. If the high-power mode has not been selected then Auto Stop continues to be allowed in step 64. Otherwise, Auto Stop is inhibited in step 66.

Since the 24-volt power net is interconnected with the 12-volt power net, the power-net voltages can affect each other during vehicle operation. Regulation of the voltages (as provided by the respective alternators) may be dynamically controlled as disclosed below. In particular, it is desirable to dynamically control the voltage of the 24-volt power net so that Auto Stop and SRC functions of the 12-volt power net are not affected by the voltage of the 24-volt power net. In addition, the SRC feature can be used on the 24-volt power net to charge the parallel auxiliary batteries by "free energy" when vehicle is decelerated by the brake pedal in order to further improve the vehicle fuel economy.

Each alternator is controlled according to a respective voltage set point. BattULoChrg_U_Cmd is the voltage set point for the 12-volt alternator. During engine running, BattULoChrg_U_Cmd is determined based on measured battery and vehicle parameters (battery SOC, voltage, current, temperature, and vehicle acceleration/deceleration status) to optimize the SRC (Smart-Regen-Charging) function in a conventional manner.

For the 24-volt power net as shown in FIG. 3, the voltage across the parallel auxiliary batteries (VBatt_24V) is set to a value denoted as VBatt_FloatChg24V. Preferably, VBatt_FloatChg24V is about 26 volts so that the SOC of these two batteries is always close to 100% (and ensuring that charging current remains small to avoid potential over charging). The conventional calculation of BattULoChrg_U_Cmd is not affected if the current through the auxiliary batteries of the 24-volt power net is very small. Therefore, a conventional algorithm for determining BattULoChrg_U_C md can be used.

In a first embodiment, a voltage set point for the 24-volt alternator is set according to a formula:

$$\text{BattULoChrg\_}U\text{\_Cmd\_24V} = \text{BattULoChrg\_}U\text{\_Cmd} + \text{VBatt\_FloatChg12V}$$

where BattULoChrg_U_Cmd_24V is the voltage set point for 24-volt alternator, and where VBatt_FloatChg12V is a floating charging voltage for a 12-volt battery (which is about 13V at room temperature and is adjusted according to battery temperature).

In a second embodiment, the voltage set point for the 24-volt alternator is adjusted in a manner that optimizes performance with respect to use of the SRC function. When the vehicle is decelerated using the brake pedal, the combustion engine consumes little or no fuel and the alternator can be used to brake the vehicle. In this condition, output electric power from the alternator can convert "braking energy" of the vehicle to a battery charging current without consuming fuel. In this condition, the alternator output voltage is preferably adjusted higher so that the batteries can be charged using a larger current.

During vehicle acceleration, the efficiency of the combustion engine is lower than normal. In this condition, the alternator voltage is preferably adjusted to be lower than the battery voltage so that the power net will be supported by the corresponding batteries and the alternator load on the combustion engine is reduced during the acceleration.

Accordingly, a voltage set point is selected based on a mode of the SRC function. For the 24-volt power net, a variable ChargeMode_24V is created to represent vehicle deceleration/acceleration states as follows:
1) ChargeMode_24V=REGEN, when the vehicle is at a high combustion efficiency (e.g., during vehicle deceleration);
2) ChargeMode_24V=DISCHARGE, when vehicle is at a low combustion efficiency (e.g., during vehicle acceleration); and
3) ChargeMode_24V=NORMAL, with normal combustion engine efficiency.

The voltage set point for the 24-volt alternator when in the NORMAL charge mode is determined according to a formula:

$$\text{BattULoChrg\_}U\text{\_Cmd\_24V} = \text{BattULoChrg\_}U\text{\_Cmd} + \text{BattULoChrg\_}U\text{\_Cmd\_AuxBatt}$$

where BattULoChrg_U_Cmd_24V is the voltage set point of the 24-volt alternator, where BattULoChrg_U_Cmd is the voltage set point for the 12-volt alternator as determined above, and where BattULoChrg_U_Cmd_AuxBatt is the desired voltage across the parallel auxiliary batteries (determined in advance to optimize the charging/discharging control of the batteries).

Figure 6:
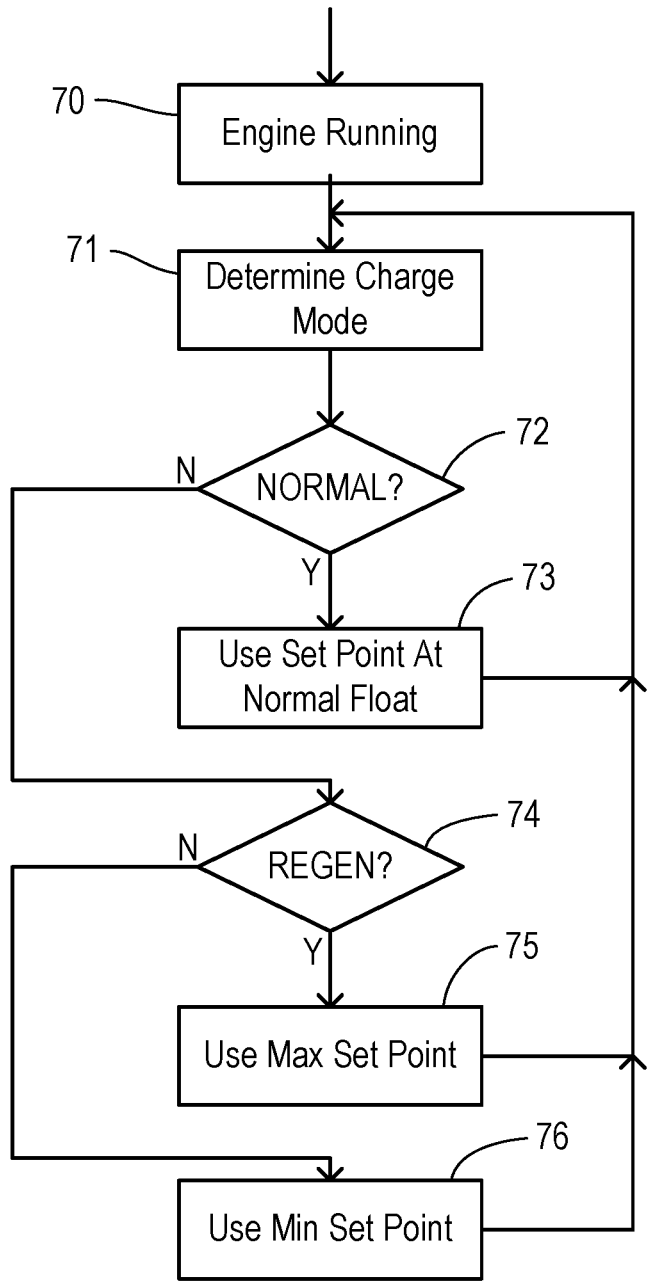
FIG. 6 is a flowchart showing a method for another aspect of the invention.

FIG. 6 shows a preferred method for using a voltage set point adjusted according to the variable charge modes defined above. With the engine running in step 70, the method selects a charge mode in step 71 according to the instantaneous vehicle acceleration or deceleration. In step 72, a check is performed to determine whether the acceleration indicates that a normal combustion efficiency is present, and if so then the set point is determined in step 73 using a normal floating voltage for the 24-volt power net over the contemporaneous measured value of the voltage on the 12-volt power net.

If not in the NORMAL mode, then a check is performed in step 74 to determine whether vehicle acceleration indicates the REGEN mode. If so, then the voltage setpoint for the 24V alternator is set to a maximum value in step 75, thereby maximizing the charging current delivered to the auxiliary batteries. If not in the REGEN mode, then the charge mode is necessarily in the DISCHARGE mode and there is a high vehicle acceleration. In that case, the voltage setpoint for the 24V alternator is set to a minimum value in step 76.

The use of parallel auxiliary batteries as shown in FIG. 3 provides a significant extension of the ability to operate the PttB during Auto Stop. However, the use of two batteries is not necessary. An embodiment of the invention using a single small capacity battery for the auxiliary battery between the 12-volt power net and the 24-volt power net can still provide an improvement of about 50% over the conventional architecture of FIG. 2.

What is claimed is:

1. A vehicle, comprising:
an internal combustion engine;
a first DC bus adapted to connect to a plurality of DC loads;
a primary battery coupled between the first DC bus and a ground;
a first alternator driven by the internal combustion engine to supply electrical power to the first DC bus;
a starter motor coupled to the first DC bus for restarting the engine using electrical power from the primary battery;
a second DC bus;
an auxiliary battery with a positive terminal connected to the second DC bus and a negative terminal connected to the first DC bus;
a second alternator driven by the internal combustion engine to supply electrical power to the second bus at a voltage corresponding to a sum of voltages of the primary and auxiliary batteries; and
an inverter receiving electrical power from the second DC bus to generate an AC output adapted to connect to accessory AC loads;
wherein the internal combustion engine is operated according to an auto start-stop function which automatically stops the engine under first predetermined conditions and then restarts the engine under second predetermined conditions, wherein the inverter receives electrical power from the auxiliary battery and the primary battery when the engine is automatically stopped.

2. The vehicle of claim 1 further comprising:
a secondary battery having a positive terminal coupled to the first bus to increase a capacity for supplying electrical power to the plurality of DC loads, wherein the secondary battery has a rated capacity less than a rated capacity of the primary battery.

3. The vehicle of claim 1 wherein the first predetermined conditions are comprised of monitored power availability from the batteries and load demand for the inverter, and wherein the automatic stopping of the engine is inhibited if the load demand for the inverter is greater than the power availability from the batteries.

4. The vehicle of claim 3 wherein the second predetermined conditions are comprised of monitored power availability from the batteries and load demand for the inverter, and wherein the automatic restarting of the engine is activated if the power availability from the batteries is less than the load demand for the inverter.

5. The vehicle of claim 1 wherein the first predetermined conditions are comprised of monitored load demand for the inverter, and wherein the automatic stopping of the engine is allowed if the load demand for the inverter is less than a predetermined threshold.

6. The vehicle of claim 1 wherein the first DC bus is a nominal 12V bus and wherein the second bus is a nominal 24V bus.

7. The vehicle of claim 1 wherein the second alternator is regulated according to a setpoint, wherein the setpoint has a maximum value when the vehicle is decelerating, and wherein the setpoint has a minimum value when the vehicle is accelerating.

8. A vehicle electrical system adapted for use with an internal combustion engine which is operated according to an auto start-stop function which automatically stops the engine under first predetermined conditions and then restarts the engine under second predetermined conditions, comprising:
a first DC bus adapted to connect to a plurality of DC loads;
a primary battery coupled between the first DC bus and a ground;
a first alternator configured to be driven by an internal combustion engine to supply electrical power to the first DC bus;
a starter motor coupled to the first DC bus for restarting the engine using electrical power from the primary battery;
a second DC bus;
an auxiliary battery with a positive terminal connected to the second DC bus and a negative terminal connected to the first DC bus;
a second alternator configured to be driven by the internal combustion engine to supply electrical power to the second bus at a voltage corresponding to a sum of voltages of the primary and auxiliary batteries; and
an inverter receiving electrical power from the second DC bus to generate an AC output adapted to connect to accessory AC loads, wherein the inverter receives electrical power from the auxiliary battery and the primary battery when the engine is automatically stopped.

9. The vehicle electrical system of claim 8 wherein the auxiliary battery is comprised of two batteries in parallel, and wherein a rated capacity of the two batteries in parallel is less than a rated capacity of the primary battery.

10. The vehicle electrical system of claim 8 further comprising:

a secondary battery having a positive terminal coupled to the first bus to increase a capacity for supplying electrical power to the plurality of DC loads, wherein the secondary battery has a rated capacity less than a rated capacity of the primary battery.

11. The vehicle electrical system of claim 8 wherein the first predetermined conditions are comprised of monitored power availability from the batteries and load demand for the inverter, and wherein the automatic stopping of the engine is inhibited if the load demand for the inverter is greater than the power availability from the batteries.

12. The vehicle electrical system of claim 11 wherein the second predetermined conditions are comprised of monitored power availability from the batteries and load demand for the inverter, and wherein the automatic restarting of the engine is activated if the power availability from the batteries is less than the load demand for the inverter.

13. The vehicle electrical system of claim 8 wherein the first predetermined conditions are comprised of monitored load demand for the inverter, and wherein the automatic stopping of the engine is allowed if the load demand for the inverter is less than a predetermined threshold.

14. The vehicle electrical system of claim 8 wherein the first DC bus is a nominal 12V bus and wherein the second bus is a nominal 24V bus.

15. The vehicle electrical system of claim 8 wherein the first DC bus is a nominal 12V bus and wherein the second bus is a nominal 36V bus.

16. The vehicle electrical system of claim 8 wherein the first DC bus is a nominal 12V bus and wherein the second bus is a nominal 48V bus.

17. A vehicle electrical system, comprising:
a first DC bus adapted to connect to a plurality of DC loads;
a primary battery coupled between the first DC bus and a ground;
a first alternator configured to be driven by an internal combustion engine to supply electrical power to the first DC bus;
a second DC bus;
an auxiliary battery with a positive terminal connected to the second DC bus and a negative terminal connected to the first DC bus;
a second alternator configured to be driven by the internal combustion engine to supply electrical power to the second bus at a voltage corresponding to a sum of voltages of the primary and auxiliary batteries; and
an inverter receiving electrical power from the second DC bus to generate an AC output adapted to connect to accessory AC loads;
wherein the second alternator is regulated according to a setpoint, wherein the setpoint has a maximum value when the vehicle is decelerating, and wherein the setpoint has a minimum value when the vehicle is accelerating.

* * * * *